United States Patent
Compton et al.

(10) Patent No.: US 10,599,675 B2
(45) Date of Patent: *Mar. 24, 2020

(54) HYBRID DATA REPLICATION

(71) Applicant: INTERNATIONAL BUSINESS MACHINES CORPORATION, Armonk, NY (US)

(72) Inventors: Scott B. Compton, Hyde Park, NY (US); Peter G. Sutton, Poughkeepsie, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1198 days.

This patent is subject to a terminal disclaimer.

(21) Appl. No.: 14/811,085

(22) Filed: Jul. 28, 2015

(65) Prior Publication Data
US 2016/0092539 A1  Mar. 31, 2016

Related U.S. Application Data

(63) Continuation of application No. 14/502,362, filed on Sep. 30, 2014, now Pat. No. 9,940,379.

(51) Int. Cl.
*G06F 7/00* (2006.01)
*G06F 16/27* (2019.01)

(52) U.S. Cl.
CPC ................... *G06F 16/275* (2019.01)

(58) Field of Classification Search
CPC .. G06F 16/1794; G06F 16/9532; G06F 16/10; G06F 16/285
See application file for complete search history.

(56) References Cited

U.S. PATENT DOCUMENTS

| 7,089,384 B2* | 8/2006 | Tross ................... G06F 11/2074 707/999.202 |
| 7,191,284 B1 | 3/2007 | Gupta et al. |
| 7,406,487 B1* | 7/2008 | Gupta ................. G06F 16/1844 |

(Continued)

OTHER PUBLICATIONS

List of IBM Patents or Patent Applications Treated as Related; POU920140113US2, Date File: Jul. 28, 2015, pp. 1-2.

(Continued)

*Primary Examiner* — Daniel A Kuddus

(74) *Attorney, Agent, or Firm* — Cantor Colburn LLP; William Kinnaman

(57) ABSTRACT

A system for accelerating database transaction processing by controlling data replication includes a first control unit configured to manage a first storage device and at least one second control unit configured to manage a second storage device. The first control unit writes first data to the first storage device and sends the first data to the second control unit responsive to receiving from a host a first write command including the first data. The first control unit writes second data to the first storage device without sending the second data to the second control unit responsive to receiving from the host a second write command. The second control unit writes the first data to the second storage device responsive to receiving the first data. The second control unit writes the second data to the second storage device responsive to receiving from the host a third write command.

5 Claims, 5 Drawing Sheets

(56) References Cited

U.S. PATENT DOCUMENTS

| | | | | |
|---|---|---|---|---|
| 7,546,364 B2* | 6/2009 | Raman | ................ | H04L 67/1095 709/224 |
| 7,698,308 B2* | 4/2010 | Kan | ................... | G06F 11/2066 707/610 |
| 7,698,374 B2* | 4/2010 | Ido | ........................ | G06F 3/0619 709/216 |
| 7,797,571 B2* | 9/2010 | Zohar | ................ | G06F 11/1435 714/6.11 |
| 7,836,266 B2* | 11/2010 | Zohar | ................ | G06F 11/1458 711/161 |
| 8,032,729 B2* | 10/2011 | Maki | .................... | G06F 9/5016 711/100 |
| 8,307,185 B2* | 11/2012 | Maki | .................... | G06F 9/5016 711/100 |
| 8,626,709 B2* | 1/2014 | Isaacson | ................. | G06F 16/27 707/613 |
| 8,683,148 B2* | 3/2014 | Raz | ........................ | G06F 3/0617 711/103 |
| 8,745,274 B2* | 6/2014 | Sato | .................... | B41J 2/17553 710/1 |
| 8,924,347 B1 | 12/2014 | Kasera et al. | | |
| 8,935,465 B1* | 1/2015 | Shaharabany | ...... | G06F 12/0246 711/103 |
| 2003/0217119 A1 | 11/2003 | Raman et al. | | |
| 2004/0128453 A1* | 7/2004 | Ido | ........................ | G06F 3/0619 711/147 |
| 2007/0050565 A1* | 3/2007 | Ido | ........................ | G06F 3/0619 711/147 |
| 2007/0245103 A1* | 10/2007 | Lam | .................... | G06F 11/1451 711/161 |
| 2010/0082540 A1* | 4/2010 | Isaacson | ............. | G06F 11/1458 707/624 |
| 2012/0005404 A1* | 1/2012 | Raz | ........................ | G06F 3/0617 711/103 |
| 2012/0074031 A1* | 3/2012 | Sato | ........................ | B41J 2/1753 206/525 |
| 2015/0155044 A1* | 6/2015 | Yin | ........................ | G06F 13/28 365/185.24 |
| 2015/0193360 A1* | 7/2015 | Lu | ............................ | G06F 13/28 710/48 |
| 2015/0227431 A1 | 8/2015 | Fiske et al. | | |
| 2017/0097778 A1 | 4/2017 | Craddock | | |

OTHER PUBLICATIONS

Scott B. Compton et al., "Hybrid Data Replication," U.S. Appl. No. 14/502,362, filed Sep. 30, 2014.

* cited by examiner

HYBRID DATA REPLICATION

DOMESTIC PRIORITY

This application is a continuation of U.S. patent application Ser. No. 14/502,362, filed Sep. 30, 2014, the disclosure of which is incorporated by reference herein in its entirety.

BACKGROUND

The present invention relates generally to accelerating transaction processing and data replication, and more specifically to improving transaction processing performance and preserving continuous availability by replicating data based on a hybrid database replication mechanism.

In a typical transaction processing system with a data replication process, data is replicated between a primary storage device and a secondary storage device by writing the data to the primary storage device and then to the secondary data storage device. The primary storage device notifies the host, which requested to write the data, of the completion of writing the data only after the primary storage device finishes writing the data and the secondary storage device notifies the primary storage device that the secondary storage device has finished writing the data. For some conventional data replication technologies, an overhead for the primary storage device to wait for the notification from the secondary storage device is 330 microseconds (μs) plus 10 μs per kilometer of the distance between the primary storage device and the secondary storage device.

SUMMARY

Embodiments include a computer program product, a method, and a system for controlling data replication. According to an embodiment of the present invention, a system for data replication is provided. The system includes a first control unit configured to manage a first storage device. The first control unit writes first data to the first storage device and sends the first data to a second control unit in response to receiving from a host a first write command including the first data. The first control unit writes second data to the first storage device without sending the second data to the second control unit in response to receiving from the host a second write command including the second data. The system also includes a second control unit configured to manage a second storage device. The second control unit writes the first data to the second storage device in response to receiving the first data from the first control unit. The second control unit writes the second data to the second storage device in response to receiving from the host a third write command including the second data.

According to another embodiment of the present invention, a computer program product for controlling data replication is provided. The computer program product comprises a computer readable storage medium having program instructions embodied therewith. The program instructions readable by a processing circuit cause the processing circuit to perform a method. The method identifies data to write to a storage device. Based on determining that the received data is of a first type, the method sends a first write command to a first control unit, which, in response to receiving the first write command, writes the data to a first storage device and sends the data to at least one second control unit, which writes the data to a second storage device. Based on determining that the received data is of a second type, the method sends a second write command to the first control unit, which, in response to receiving the second write command, writes the data to the first storage device but does not send the data to the second control unit. The method sends a third write command to the second control unit, which, in response to receiving the third write command, writes the data to the second storage device.

According to a further embodiment of the present invention, a method for controlling data replication is provided. The method comprises, in response to receiving, by a first control unit that manages a first storage device, a first write command including first data from a host, writing the first data to the first storage device and sending the first data to a second control unit that manages a second storage device. The method comprises, in response to receiving a second write command from the host, writing the second data to the first storage device without sending the second data to the second control unit.

According to a further embodiment of the present invention, a method for controlling data replication is provided. The method comprises, in response to receiving, by a second control unit that manages a second storage device, first data from a first control unit that manages a first storage device, writing the first data to the second storage device. The method comprises, in response to receiving a write command including second data from a host, writing the second data to the second storage device.

According to a further embodiment of the present invention, a method for controlling data replication is provided. The method comprises identifying data to write to a storage device by a host configured to communicate with a first control unit that manages a first storage device and with a second control unit that manages a second storage device. The method comprises, based on determining that the data is of a first type, sending a first write command including the data to the first control unit without sending any write command to the second control unit. The method comprises, based on determining that the data is of a second type, sending a second write command including the data to the first control unit and sending a third write command including the data to the second control unit.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
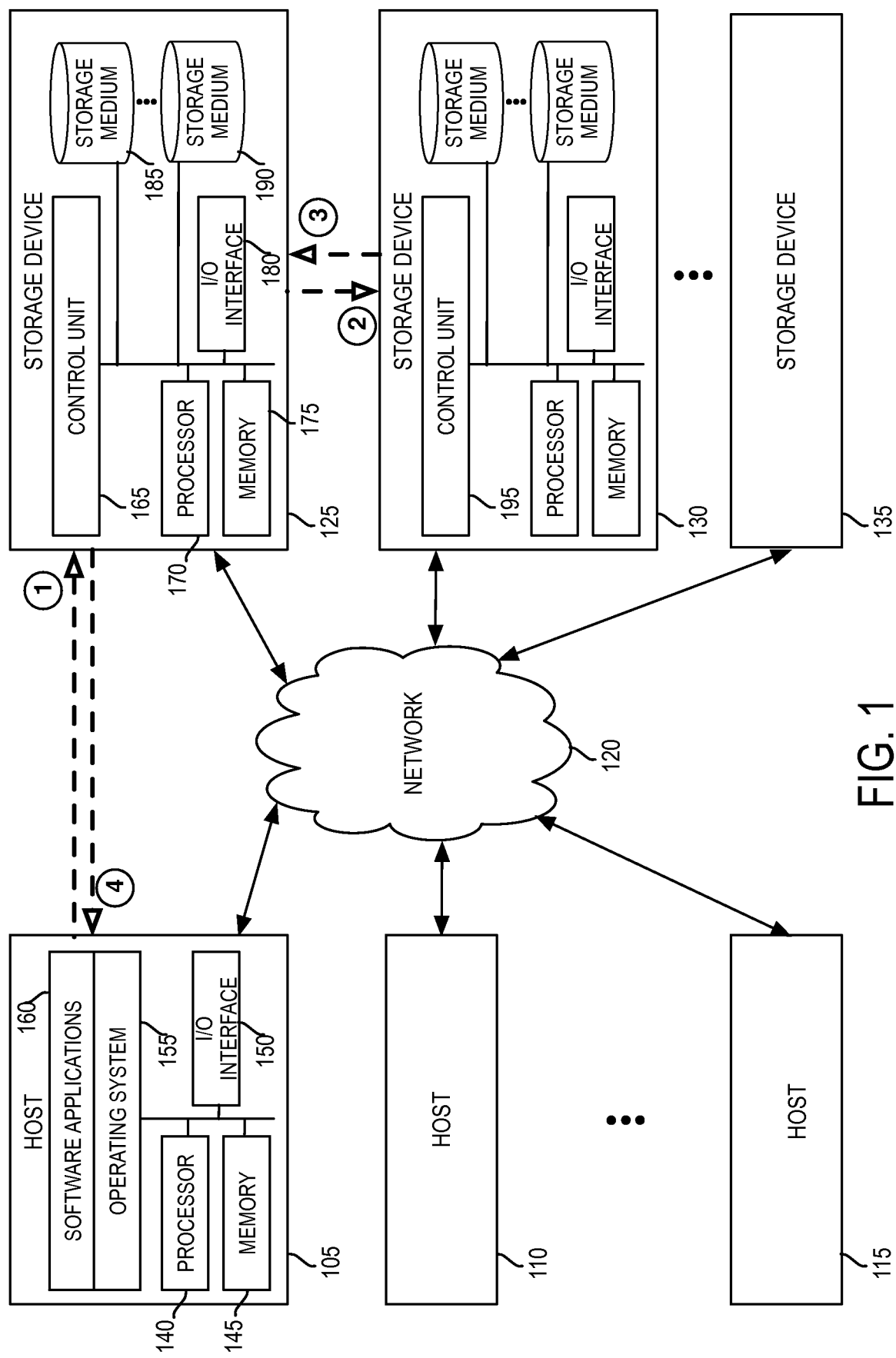
FIG. 1 depicts a data replication system performing data replication between a primary storage device and a secondary storage device according to an embodiment of the invention.

FIG. 1 illustrates an example of data replication performed for a host that requests data to be written to a data storage device. Specifically, this figure depicts hosts 105-115, a network 120, and storage devices 125-135. The hosts 105-115 store data in storage devices 125-135. The network 120 connects the hosts 105-115 and the storage devices 125-135.

The hosts 105-115 are computing devices that each include components such as a processor, a memory, an input/output (I/O) interface, etc. For example, the host 105 includes a processor 140, a memory 145 and an input/output (I/O) interface 150, among other components that are not depicted in FIG. 1 for simplicity of illustration and description. The host 105 also includes an operating system 155 and software applications 160 running on top of the operating system 155. The operating system 155 manages resources of the host 105 (e.g., the processor 140, the memory 145, and the I/O interface 150) and provides services to the software applications 160. For instance, the operating system 155 receives from a software application 160 a request to write data to a data storage device and sends, via the I/O interface 150, a write command to a storage device (not shown) within the host 105 or to a remote storage device, such as the storage device 125.

The storage devices 125-135 receive read/write commands from the hosts 105-115 and store, modify or provide the data accordingly. The storage devices 125-135 are also computing devices that each include components such as a processor, a memory, an I/O interface, etc. In addition, each of the storage devices 125-135 includes one or more storage media (e.g., memory, disk, tape, etc.) for storing data. Each of the storage devices 125-135 also includes a control unit, which is a module configured to manage each storage device by processing the read/write commands received from the hosts or by replicating data received from another storage device. As shown, the storage device 125 includes a control unit 165, a processor 170, a memory 175, an I/O interface 180, and storage media 185-190. The control unit 165 uses the processor 170, the memory 175 and the I/O interface 180 to replicate data and to process the read/write commands from the hosts. The storage device 130 includes a control unit 195.

In some embodiments, two or more of the storage devices 125-135 may be configured (e.g., by an administrator) to form a relationship referred to as a synchronous replication or mirroring relationship, in which one of the storage devices is a primary storage device and one or more other storages devices are secondary storage devices. In a synchronous replication relationship, the data written to the primary storage device is replicated to one or more secondary storage devices. Secondary devices are implemented not to accept read or write data commands from the hosts. The control units of the primary and secondary storage devices communicate with each other to replicate data. Moreover, the control unit of a secondary storage device rejects any write command from the hosts or may be configured to be invisible to the hosts such that the hosts cannot attempt to send write commands to a secondary storage device.

In some embodiments, the configuration information for the storage devices that form a synchronous replication relationship is sent to the hosts 105-115 so that the hosts 105-115 can identify the storage devices are forming synchronous replication relationships—one storage device as a primary storage device and one or more other storage devices as secondary storage devices. Specifically, the operating systems of the hosts use the configuration information for the storage devices to identify the storage devices to which to send write commands. The configuration information for the storage devices may be updated when there is a change in relationship between the storage devices.

In some embodiments, the network 120 includes one or more fabrics (not shown), each of which includes a group of network forwarding elements (e.g., switches, routers, gateways, etc.). The fabrics include storage area network (SAN) fabrics, local area network (LAN) fabrics, and/or wide area network (WAN) fabrics. The fabrics provide the hosts 105-115 with access to the storage devices 125-135 and also allow the storage devices 125-135 to communicate with each other. The storage devices 125-135 may be operating in different data centers that are apart from each other by hundreds or thousands of kilometers.

To illustrate an example of data replication performed for the host 105, it is assumed that the storage device 125 and the storage device 130 form a synchronous replication relationship. It is also assumed that the host 105 has the configuration information specifying that the storage device 125 is a primary storage device and the storage device 195 is a secondary storage device. The dotted arrow with an encircled 1 indicates that the host 105 sends a write command including the data to write to the storage device 125. Upon receiving the write command, the control unit 165 of the storage device 125 writes the data to one or more of the storage media 185-190.

The dotted arrow with an encircled 2 indicates that the control unit 165 of the primary storage device 125 also sends the data to the control unit 195 of the secondary storage device 130 so that the data is replicated at the storage device 130. In some embodiments, the control units 165 and 195 use a replication protocol (e.g., Peer to Peer Remote Copy (PPRC)) to facilitate data replication or mirroring between the storage devices 125 and 130. The dotted arrow with an encircled 3 indicates that the control unit 195 of the secondary storage device notifies the control unit 165 of the primary storage device whether writing the data to the secondary storage device 130 has been successful or not. Writing to the secondary storage device 130 may be deemed unsuccessful if the control unit 165 of the primary storage device 125 does not receive any notification within a threshold amount of time.

The dotted arrow with an encircled 4 indicates that the control unit 165 notifies the host 105 of successful or unsuccessful writing of the data. The control unit 165 of the primary storage device notifies of successful writing only if the data is written successfully to both of the primary and secondary storage devices 125 and 130. When writing to either or both of the primary and secondary storage devices 125 and 130 is unsuccessful, the control unit 164 of the primary storage device notifies the host 105 that writing the data has been unsuccessful.

As illustrated by this example, the amount of time for which the host 105 has to wait for a notification of the completion of writing data after sending the write command to the primary storage device includes the amount of time for which the primary storage device has to wait for a notification from the secondary storage device. The latter amount of time depends on the distance between the primary and secondary storage devices and thus may have a significant impact on the I/O performance of the operating system 155 of the host 125 if the distance between the two storage devices is very large.

Figure 2:
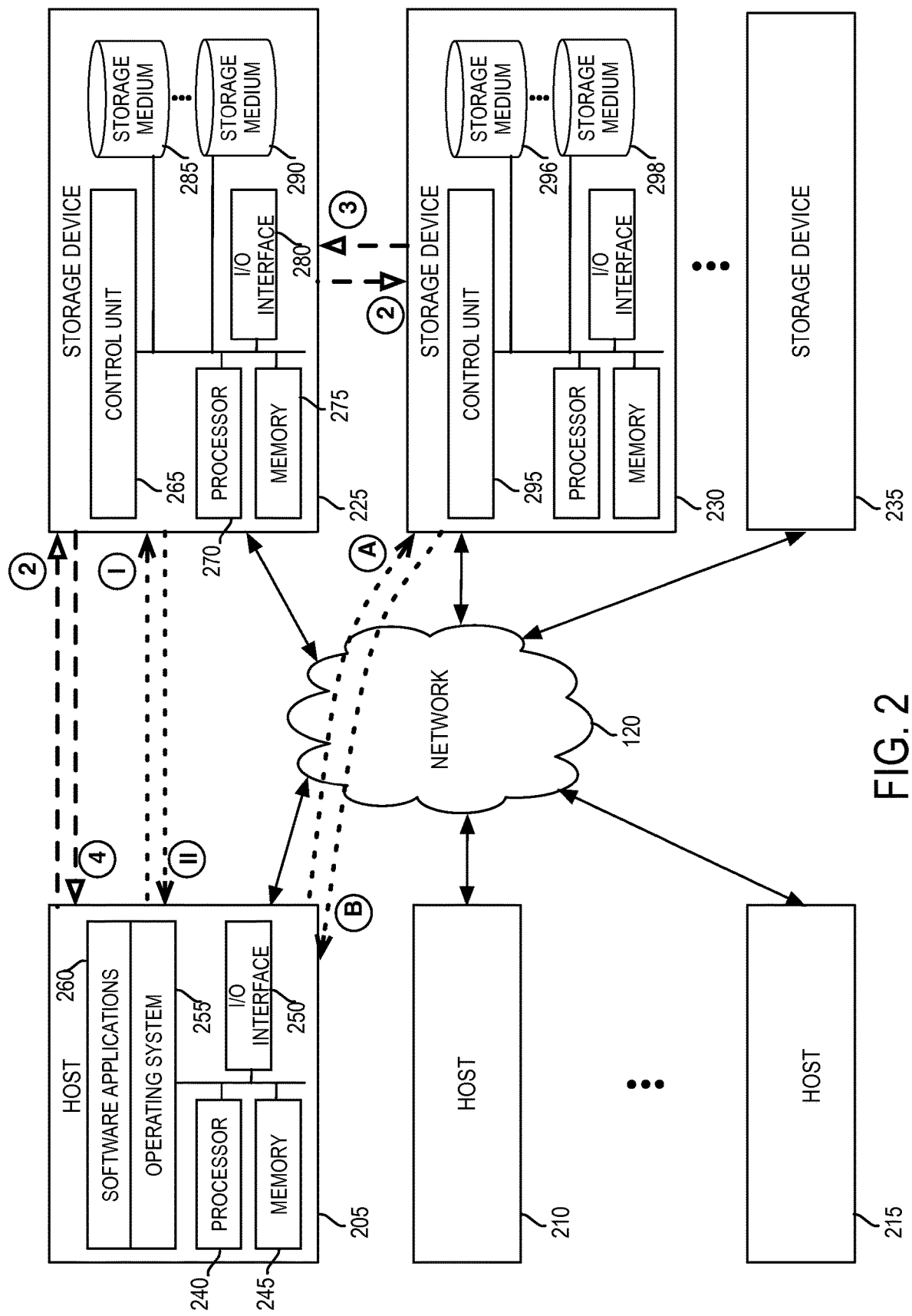
FIG. 2 depicts a data replication system performing data replication between a primary storage device and a secondary storage device according to an embodiment of the invention.

FIG. 2 illustrates a hybrid data replication mechanism that improves I/O performance of an operating system for a host. Specifically, this figure depicts hosts 205-215, the network 120, and storage devices 225-235. Like the hosts 105-115 of FIG. 1, the hosts 205-215 store data in storage devices 225-235. The network 120 connects the hosts 205-215 and the storage devices 225-235.

The hosts 205-215 are similar to the hosts 105-115. That is, like the hosts 105-115, the hosts 205-215 are computing devices that each include components such as a processor, a memory, an input/output (I/O) interface, etc., as well as software applications and an operating system. The storage devices 225-235 are similar to the storage devices 125-135 of FIG. 1—the storage devices 125-135 are computing devices that each include components such as a processor, a memory, an I/O interface, etc., as well as one or more storage media for storing data.

In some embodiments, the hosts 205-215 may be provided with write commands, which allow for indicating (e.g., by a flag in a write command) whether the requirements of a synchronous replication relationship are to be applied. That is, these write commands allow the hosts 205-215 to bypass the requirements of a synchronous replication relationship. Such write commands, therefore, allows the hosts 205-215 to control data replication rather than relying on the control unit of the primary storage device for data replication control. The hosts 205-215 may determine the types of the data to write to the storage devices 225-235 and indicate in the write commands the applicability of the requirements of a synchronous replication relationship based on the determined types of the data. That is, for certain types of data, the hosts 205-215 send write commands to a primary storage device as well as to a set of secondary storage devices without being rejected. For other types of data, the hosts 205-215 send the data only to the primary storage device so that the primary storage device sends the data to the set of secondary storage devices to replicate the data.

In some embodiments, the types of data for which the hosts 205-215 bypass the synchronous replication relationship requirements include a database log. As is known, a database log is a history of actions executed by a database management system. The database management system uses the database log to apply to an image copy of the database from a prior point in time to bring the database back to the latest consistent point in time before an event that caused inconsistency in the database occurred.

Each of the storage devices 225-235 also includes a control unit. Two or more control units of the storage devices 225-235 may be configured to form a synchronous replication relationship. However, the synchronous replication relationship formed by the storage devices 225-235 does not stand for all write commands to write data to the storage devices 225-235. That is, only for those write commands that indicate applicability of the synchronous replication relationship requirements, the storage devices forming a synchronous replication relationship apply the requirements—that only the primary storage device accepts write commands from the hosts and that the primary storage device notifies of a successful completion of writing the data only if writing to both the primary and secondary devices is successfully completed. For other write commands that do not indicate applicability of the requirements, the storage devices that form a synchronous replication relationship do not impose the same requirements. That is, a secondary storage device may accept write commands from the hosts, and the primary storage device does not send the data to any secondary storage device for replication. Thus, the primary storage device does not have to wait for a notification from any secondary storage device of completion of writing data to the secondary storage device.

To illustrate an example of data replication controlled by a host that uses these write commands, it is assumed that the storage device 225 and the storage device 230 form a synchronous replication relationship and that the host 205 is provided with the write commands that allow the host 205 to bypass the synchronous replication relationship requirements. It is also assumed that the host 205 has configuration information that the storage device 225 is a primary storage device and the storage device 230 is a secondary storage device.

In this example, the operating system 255 receives a request to write data to a storage device from a software application 260 running on top of the operating system 255. The operating system 255 then determines the type of the received data. The operating system 255 determines the type of the received data by examining the received data. Alternatively or conjunctively, the software application 260 may specify the type in the request. In this example, the operating system 255 determines that the received data includes a database log. The dotted arrow with an encircled I indicates that the host 205 sends a write command (not shown) including the data to write and a flag that indicates the synchronous replication relationship requirements should be bypassed to the primary storage device 225. The dotted arrow with an encircled A indicates that the host 205 sends another write command (not shown) that is the same as the write command being sent to the primary storage device 225 to the secondary storage device 230. The hosts 205 sends these two write commands together or in a rapid succession so that the receiving storage devices process the write commands in parallel rather than serially.

In response to receiving the write command from the host 205, the control unit 265 of the primary storage device 225 writes the data to one or more of the storage media 285-290. The dotted arrow with an encircled II indicates that the control unit 265 notifies the host 205 that the primary storage device 225 has successfully or unsuccessfully written the data. Unlike the control unit 165 of FIG. 1, however, the control unit 265 of the primary storage device 225 does not send the data to a secondary storage device and thus does not wait for any notification from the secondary storage device regarding writing the data to the secondary storage device. That is, the two write commands are processed in parallel rather than serially, and the notification from the primary storage device 225 is sent to the host 205, independent of a notification sent by the secondary storage device 225 to the host 205.

In response to receiving the write command from the host 205, the control unit 295 of the secondary storage device 225 writes the data to one or more of the storage media 296-298. The dotted arrow with an encircled B indicates that the control unit 295 notifies the host 205 that the secondary storage device 230 has successfully or unsuccessfully written the data. Unlike the control unit 195 of FIG. 1, however, the control unit 295 of the secondary storage device 230 accepts a write command sent from a host and does not send any notification regarding writing the data back to the primary storage device.

As illustrated by this example, the total amount of time for which the host 205 has to wait for the completion of writing data to the primary and secondary storage devices may be much shorter than the amount of time for which the host 105 of FIG. 1 has to wait for the completion of writing data. This is because, in this example, writing data to the primary and second storage devices is performed in parallel as the writing commands to the primary and second storage devices are sent out together (or in a rapid succession). Thus, the total amount of time does not include the overhead for the primary storage device to wait for a notification from a second storage device. The time saving becomes larger for a longer distance between the primary and secondary storage devices. Thereby, the functioning of the host 205, a computing device, itself may be improved.

It is to be noted that, in this example, the control unit 295 of the primary storage device 225 may still control data replication for certain type of data if the write command received from the host 205 does not indicate that the synchronous replication relationship requirements are to be bypassed. The sequence of operations performed by the host 205 and the storage devices 225 and 230 is illustrated by the solid arrows with encircled 1-4. This allows a system that controls data replication based on a synchronous replication relationship (e.g., systems described in the U.S. Pat. No. 7,084,956) to implement the bypassing feature without modifying the systems' existing features.

Figure 3:
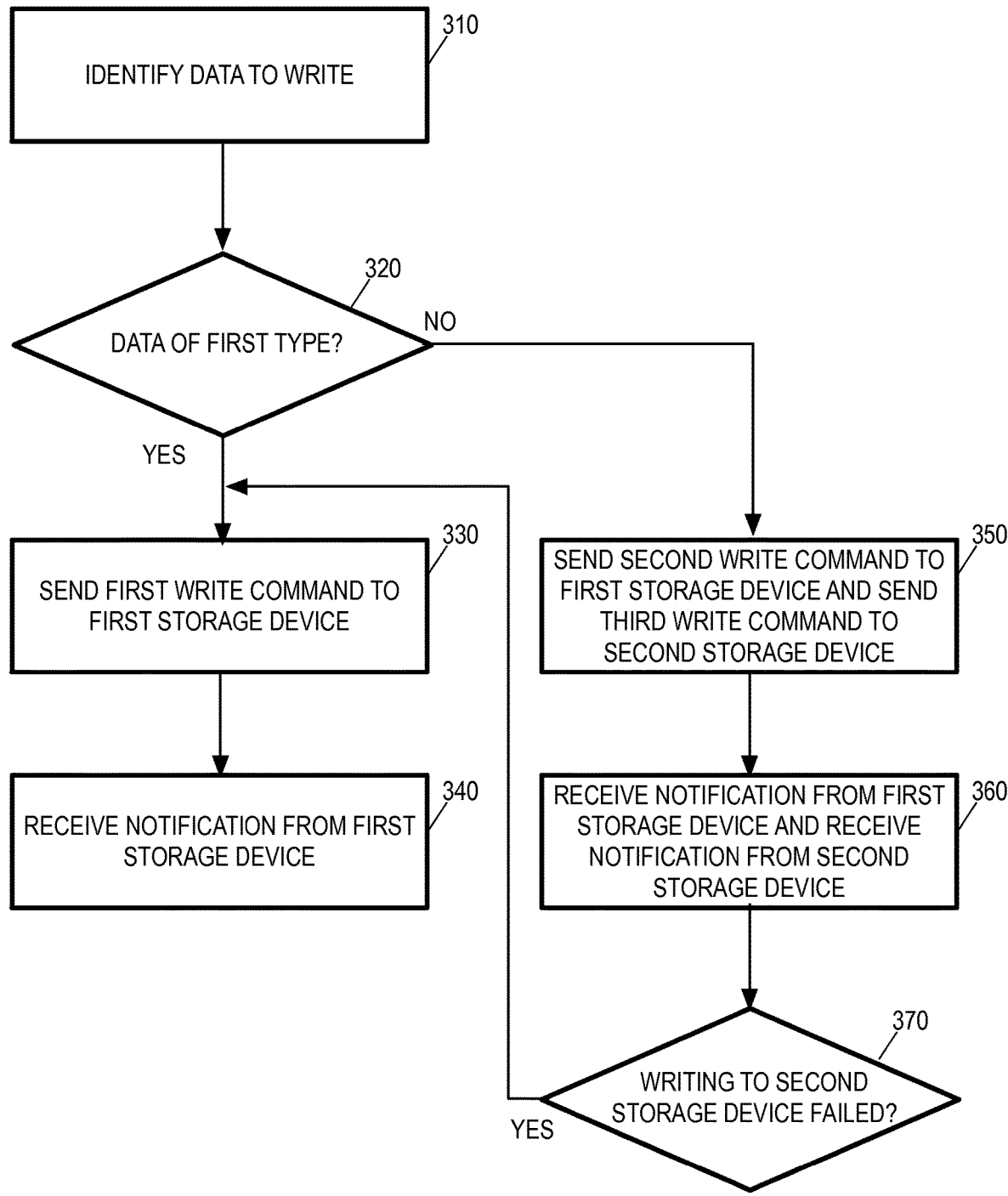
FIG. 3 depicts a process flow for controlling data replication at a host according to an embodiment of the invention.

FIG. 3 depicts a process flow for controlling data replication in accordance with some embodiments of the invention. In some embodiments, the operating system 255 for the host 205 performs the process flow shown in FIG. 3. In some embodiments, the operating system 255 is provided with configuration information specifying which storage devices are configured to form synchronous replication relationships (i.e., which storage device is a primary storage device and which other storage device or devices are secondary storage device(s). The operating system 255 also implements write commands that allow for bypassing the synchronous replication requirements.

At block 310, the operating system 255 identifies data to write to a storage device. For instance, the operating system 255 receives, from a software application 260, a request to write data to a storage device. The operating system 255 then determines at block 320 the type of the data. Based on determining at block 320 that the received data is of a first type, the operating system proceeds to block 330 to generate and send a first write command to the control unit of a primary storage device. In some embodiments, the first write command includes the data to write to the primary storage device as well as a parameter (e.g., a flag) that indicates the storage device that receives this write command should apply the synchronous replication requirements. In response to receiving the first write command, the control unit of the primary storage device writes the data to one or more storage media of the primary storage device. Also, the control unit of the primary storage device sends the data to the control unit of each of one or more secondary storage devices so that the data is replicated at the secondary storage device. Once the control unit of the primary storage device successfully writes the data to the primary storage device and receives a notification from the control unit of each secondary storage device that the data is successfully written at the secondary storage device, the control unit of the primary storage device sends a notification indicating successful data writing to the operating system 255, which receives this notification at block 340.

Based on determining at block 320 that the data received from the software application is of a second type, the operating system 255 proceeds to block 350 to generate and send a second command (i.e., a second type of write command) to the control unit of the primary storage device. The operating system 255 at block 350 also generates and sends a third write command (i.e., a third type of write command) to the control unit of the secondary storage device. The second and third write commands each include a flag that indicates that a storage device receiving the second or third write command should bypass the synchronous replication relationship requirements. That is, in response to receiving the second write command (the second type of write command), the control unit of the primary storage device writes the data to the primary storage device without sending the data to any secondary storage device. In response to receiving a third write command (the third type of write command), the control unit of the secondary storage device writes the data to the second storage device without sending any notification regarding the writing of the data, to the primary storage device. The control units of the primary and secondary storage devices each send a notification to the operating system 255, which receives those notifications at block 360.

At block 370, the operating system 255 optionally determines whether the notification received from the control unit of each secondary storage device indicates writing data to the secondary storage device has not been successful. If the operating system 255 determines that writing the data at one or more secondary storage devices was unsuccessful, the operating system 255 proceeds to the block 330 to generate and send a write command to the primary storage device. This write command indicates that the synchronous replication requirements are to be applied.

Figure 4:
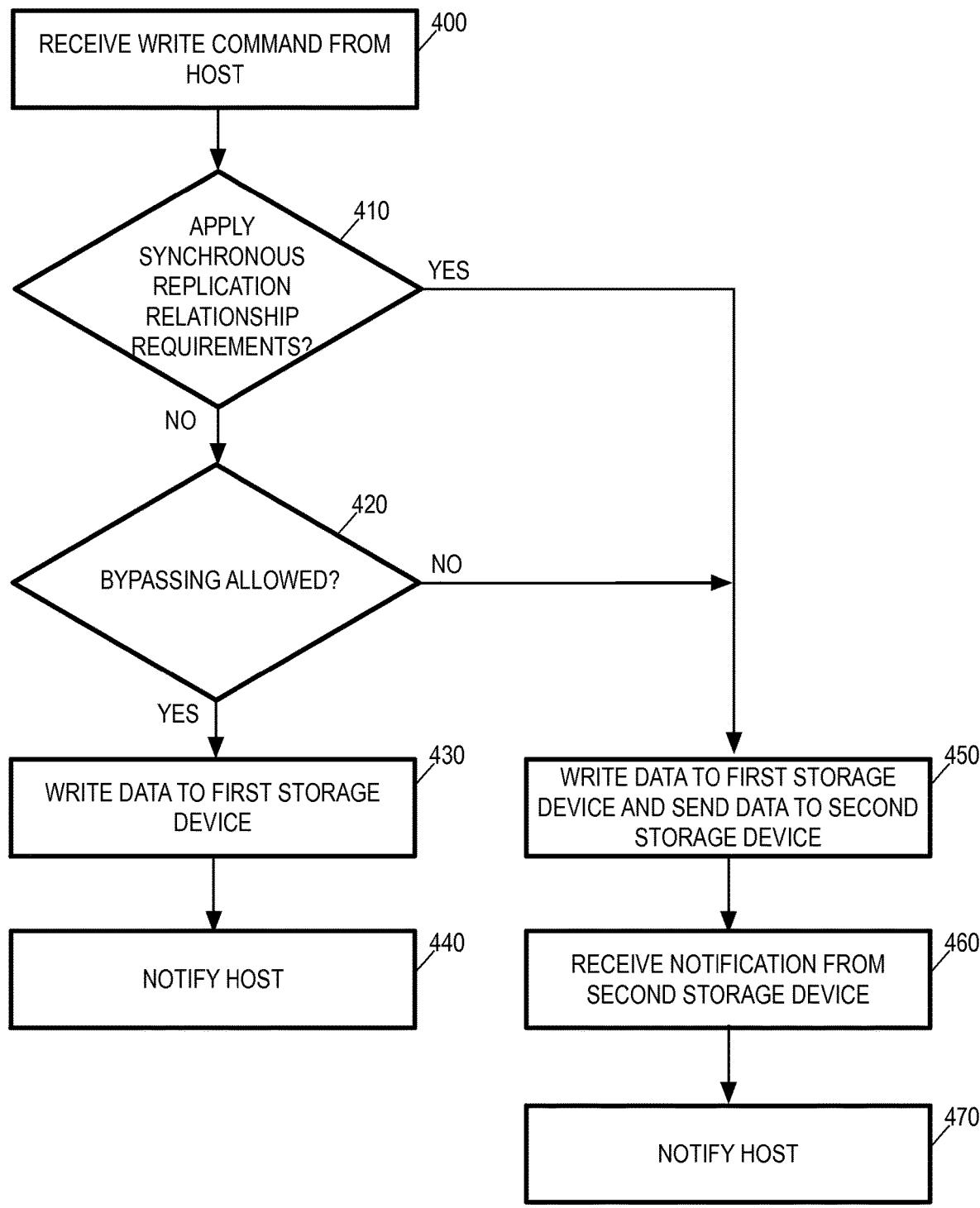
FIG. 4 depicts a process flow for controlling data replication at a primary storage device to an embodiment of the invention.

FIG. 4 depicts a process flow for controlling data replication at a primary storage device, which forms a synchronous replication relationship with a set of secondary storage devices in accordance with some embodiments of the invention. In some embodiments, the control unit 265 of the storage device 225 as the control unit of a primary storage device performs the process flow shown in FIG. 4.

At block 400, the control unit 265 receives from the host 205 a write command that includes data to write. At block 410, the control unit 265 determines whether the received write command indicates that the synchronous replication relationship requirements should be applied. In some embodiments, the control unit 265 determines that the synchronous replication relationship requirements should be applied if a flag included in the write command indicates as such. Alternatively or conjunctively, the control unit 265 may examine the data to determine the type of the data in order to determine whether the synchronous replication relationship requirements should be applied based on the type of the data.

Based on determining at block 410 that the synchronous replication relationship requirements should be skipped or bypassed, the control unit 265 proceeds to block 420, which will be described further below. Based on determining at block 410 that the synchronous replication relationship requirements should be applied, the control unit 265 proceeds to block 450 to write the data to the storage media of the primary storage device 225 and to send the data to the control unit of each of one or more secondary storage devices so that the data is replicated at the second storage device. In some embodiments, the control unit 265 is configured to determine whether to send particular data to the control units of the secondary storage devices based on one or more commands previously received from the host, including write commands and out-of-band replication commands that are not write commands. The previously received commands specify a range of data to be written to the secondary storage devices. The control unit 265 is also configured to determine not to send the particular data to the control units of the secondary storage devices when a write command for the particular data indicates that the particular data should not be sent to the control units of the secondary storage devices even if the previously received commands have indicated that data written to the primary storage device is to be sent to the control units of the secondary storage devices.

At block 460, the control unit 265 waits for and receives a notification from the control unit of each second storage device whether writing the data to the storage media of the second storage device was successful. At block 470, the control unit 265 sends to the host a notification indicating whether writing the data to a storage device has been successful or not. This notification indicates that writing has been successful only if writing to all of the primary and secondary storage devices has been successful. Otherwise, the notification indicates that writing has been unsuccessful.

Based on determining at block 410 that the synchronous replication relationship requirements should be skipped or bypassed, the control unit 265 determines at block 420 whether the control unit 265 is configured to allow for bypassing the synchronous replication relationship requirements. If the control unit 265 is configured to allow for bypassing the synchronous replication relationship requirements, the control unit 265 proceeds to block 430, which will be described further below. If the control unit 265 is not configured to allow for bypassing the requirements, the control unit 265 determines that the requirements should be applied regardless of the indication by the received write command. That is, if the control unit 265 is configured to preserve the synchronous replication relationship requirements, the control unit 265 proceeds to block 450 to apply the synchronous replication relationship requirements. In some embodiments, if the control unit 265 is configured to preserve the synchronous replication relationship requirements, the control unit 265 may reject the received write command so that the host sends another write command, which would indicate that the synchronous replication relationship requirements should be applied.

At block 430, the control unit 265 writes the data to the storage media of the primary storage device. The control unit 265 does not send the data to the control unit of any secondary storage device because the synchronous replication relationship requirements are being skipped. At block 440, the control unit 265 sends a notification to the host 205.

Figure 5:
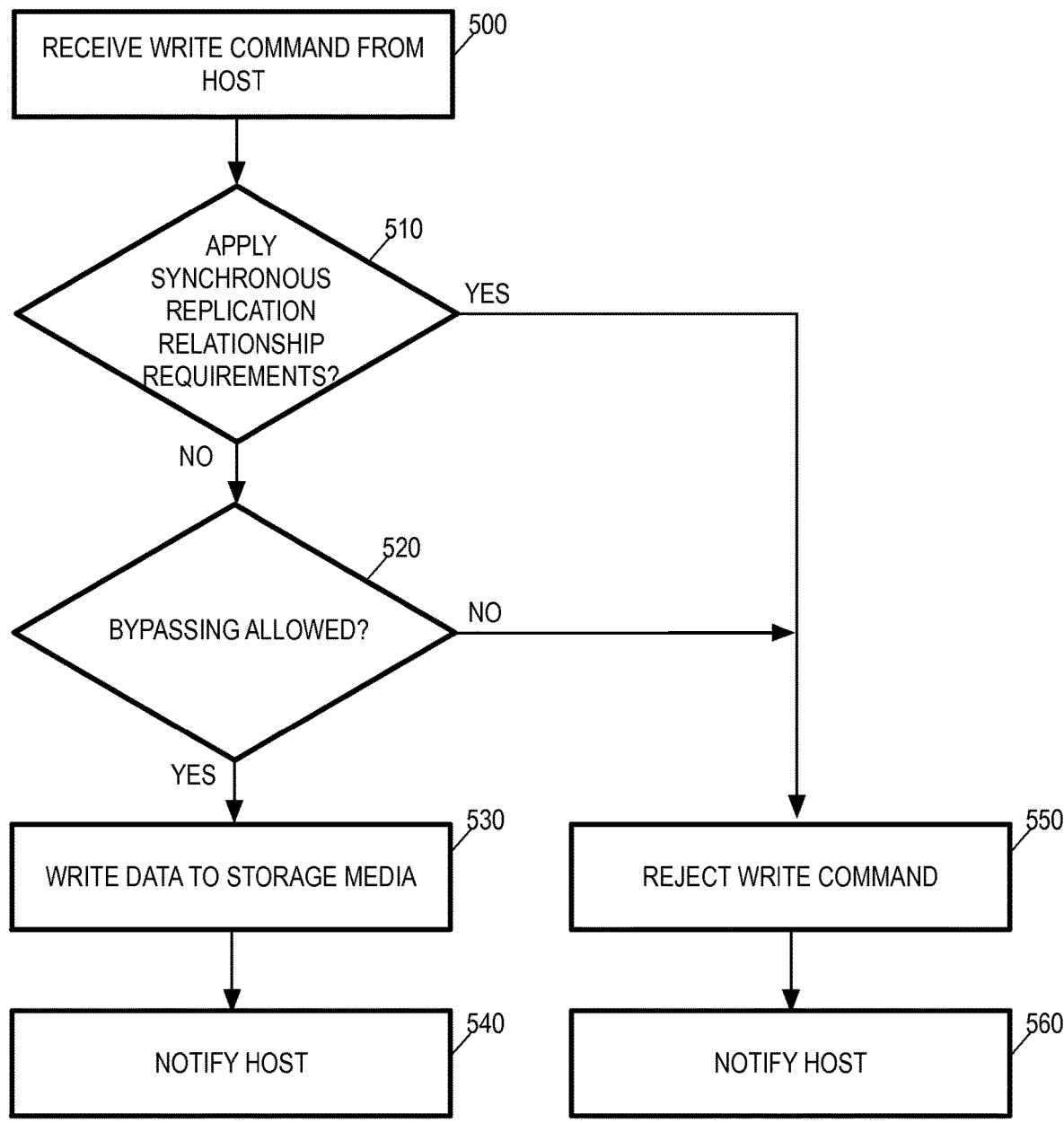
FIG. 5 depicts a process flow for controlling data replication at a secondary storage device to an embodiment of the invention.

FIG. 5 depicts a process flow for controlling data replication at a secondary storage device which forms a synchronous replication relationship with a primary secondary storage device in accordance with some embodiments of the invention. In some embodiments, the control unit 295 of the storage device 230 as a control unit of the secondary storage device performs the process flow shown in FIG. 5.

At block 500, the control unit 295 receives a write command from a host. At block 510, the control unit 295 determines whether the received write command indicates that the synchronous replication relationship requirements should be applied. In some embodiments, the control unit 295 determines that the synchronous replication relationship requirements should be applied if a flag included in the write command indicates so. Alternatively or conjunctively, determines that the synchronous replication relationship requirements should be applied based on the type of the data. That is, if the data is of a certain type (e.g., a database log), the control unit 295 determines that the synchronous replication relationship requirements should be skipped or bypassed.

Based on determining at block 510 that the synchronous replication relationship requirements should be skipped or bypassed, the control unit 295 proceeds to block 520, which will be described further below. Based on determining at block 510 that the synchronous replication relationship requirements should be applied, the control unit 295 proceeds to block 550 to reject the write command received from the host. In some embodiments, the control unit 295 sends at block 560 a notification to the host that the write command has been rejected so that the host sends another write command, which would indicate that the synchronous replication relationship requirements should be applied, to the control unit of a primary storage device. In other embodiments, the control unit 295 ignores the write command by not processing the write command.

Based on determining at block 510 that the synchronous replication relationship requirements should be skipped or bypassed, the control unit 295 determines at block 520 whether the control unit 295 is configured to allow for bypassing the synchronous replication relationship requirements. If the control unit 295 is configured to allow for bypassing the synchronous replication relationship requirements, the control unit 295 proceeds to block 530, which will be described further below. If the control unit 295 is not configured to allow for bypassing the requirements, the control unit 295 determines that the requirements should be applied regardless of the indication by the received write command. That is, if the control unit 295 is configured to preserve the synchronous replication relationship requirements, the control unit 295 proceeds to block 550 to apply the synchronous replication relationship requirements.

At block 530, the control unit 295 writes the data to the storage media of the secondary storage device 230. The control unit 295 does not reject the received write command because the synchronous replication relationship requirements are being skipped. In some embodiments, the control unit 295 is configured to write the data to the storage media of the secondary storage device 230 only when the received write command indicates that the data should be written to the secondary storage device even if one or more write commands that the host previously sent to the control unit of a primary storage device indicate that the control unit of the primary storage device should send data to the control unit 295. At block 540, the control unit 295 sends a notification to the host 205. The control unit 295 does not send any notification to the primary storage device regarding writing the data to the storage media of the secondary storage device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for controlling data replication, comprising:
   identifying data to write to a storage device;
   based on determining that the data is of a first data type, sending a first write command to a first processor, which, in response to receiving the first write command, writes the data to a first storage device and sends the data to at least one second processor, which writes the data to a second storage device, including the data to the first processor without sending any write command to the second processor, wherein the first write command includes an indication that synchronous replication is required, and wherein the indication comprises at least one of a flag included in the first write command and a data type for the first data; and based on determining that the data is of a second data type:

sending a second write command to the first processor that writes the data to the first storage device but does not send the data to the second processor, based on receiving the second write command, wherein the second write command includes an indication that synchronous replication is not required; and sending a third write command to the second processor that writes the data to the second storage device, based on receiving the third write command; and receiving, from the second processor, a notification indicating that writing the data to the second storage device has not been successful, wherein the data is of the second type; and in response to receiving the notification from the second processor, sending to the first processor a fourth write command including the data, which, in response to receiving the fourth write command, writes the data to the first storage device and sends the data to the second processor, which writes the data to the second storage device and sends to the first processor a notification indicating that writing to the second storage device has been successful.

2. The method of claim 1, wherein the second type of data comprises a database log.

3. The method of claim 1, wherein the second processor sends to the processor a notification indicating that writing the data to the second storage device has been successful, based on receiving the data from the first processor; and further comprising receiving a notification indicating writing data to a storage device has been successful, wherein the first processor generates the notification when writing data to both the first and second storage devices has been successful.

4. The method of claim 1, wherein the second processor does not send to the first storage device any notification regarding writing the data to the second storage device based on receiving the third write command; and further comprising receiving, from the second processor, a notification indicating that writing the data to the second storage device has been successful, wherein the second processor generates the notification in response to receiving the third write command.

5. The method of claim 1, further comprising:

receiving, from the first processor, a notification indicating that writing the data to the first storage device has not been successful;

receiving, from the second processor, a notification indicating that writing the data to the second storage device has not been successful; and in response to receiving the notifications from the first processor and second processor, sending to the first processor an additional write command including the data, which, in response to receiving the additional write command, writes the data to the first storage device and sends the data to the second processor, which writes the data to the second storage device and sends to the first processor a notification indicating whether writing to the second storage device has been successful.

\* \* \* \* \*